United States Patent
Sannino et al.

(10) Patent No.: US 7,925,010 B2
(45) Date of Patent: Apr. 12, 2011

(54) MESSAGE DECIPHERING METHOD, SYSTEM AND ARTICLE

(75) Inventors: Roberto Valerio Sannino, Milan (IT); Fabio Sozzani, Vimodrone (IT); Guido Marco Bertoni, Cusano Milanino (IT); Gerardo Pelosi, Matera (IT); Pasqualina Fragneto, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1011 days.

(21) Appl. No.: 11/016,691

(22) Filed: Dec. 17, 2004

(65) Prior Publication Data

US 2005/0169464 A1   Aug. 4, 2005

(30) Foreign Application Priority Data

Dec. 24, 2003  (EP) .................................. 03425824

(51) Int. Cl.
  *H04K 1/00*   (2006.01)
  *H04L 9/00*   (2006.01)
  *H04L 9/30*   (2006.01)

(52) U.S. Cl. ............ 380/30; 380/44; 380/277; 380/278; 380/286; 713/150; 713/156; 713/163; 713/171; 726/29

(58) Field of Classification Search ............ 380/30, 380/277–278, 44, 286; 713/150, 156, 171, 713/163; 726/29
See application file for complete search history.

(56) References Cited

U.S. PATENT DOCUMENTS

| | | | |
|---|---|---|---|
| 5,623,546 A * | 4/1997 | Hardy et al. | 713/193 |
| 5,987,128 A * | 11/1999 | Baba | 380/279 |
| 6,131,090 A * | 10/2000 | Basso et al. | 706/23 |
| 6,249,873 B1 | 6/2001 | Richard et al. | |
| 6,530,020 B1 * | 3/2003 | Aoki | 713/163 |
| 6,560,581 B1 | 5/2003 | Fox et al. | |
| 6,792,534 B2 | 9/2004 | Medvinsky | |
| 6,940,980 B2 | 9/2005 | Sandhu et al. | |
| 7,142,676 B1 | 11/2006 | Hillier et al. | |
| 7,181,620 B1 * | 2/2007 | Hur | 713/171 |
| 7,366,900 B2 | 4/2008 | Shambroom | |
| 7,409,554 B2 | 8/2008 | Ishibashi et al. | |
| 2003/0182554 A1 | 9/2003 | Gentry et al. | 713/171 |
| 2004/0019779 A1 | 1/2004 | Harrison et al. | |
| 2004/0102183 A1 | 5/2004 | Haub et al. | |

(Continued)

FOREIGN PATENT DOCUMENTS

WO      WO 03/077498 A1      9/2003

OTHER PUBLICATIONS

Boneh, D., et al., "Identity-based Encryption from the Weil Pairing," in *Proceedings of the Annual International Cryptology Conference*, Santa Barbara, CA, Aug. 19-23, 2001, pp. 213-229.

(Continued)

*Primary Examiner* — Christian LaForgia
*Assistant Examiner* — Kari L Schmidt
(74) *Attorney, Agent, or Firm* — Lisa K. Jorgenson; Thomas J. Satagaj; Seed IP Law Group PLLC (57) ABSTRACT

A method decrypts the encrypted messages sent by a transmission device to a first electronic device associated with a first trusted authority and to a second electronic device. In one embodiment, first and second tokens are generated and exchanged, respectively, by the first and second electronic devices, which then generate a joint decryption key in order to decrypt the encrypted message.

22 Claims, 3 Drawing Sheets

U.S. PATENT DOCUMENTS

| | | |
|---|---|---|
| 2004/0104097 A1 | 6/2004 | Ngee |
| 2004/0131191 A1* | 7/2004 | Chen et al. .................... 380/282 |
| 2005/0058294 A1 | 3/2005 | Chen et al. |
| 2005/0102512 A1 | 5/2005 | Goh et al. |
| 2005/0125670 A1 | 6/2005 | Sozzani et al. |

OTHER PUBLICATIONS

Yi, X., "Efficient ID-based Key Agreement from Weil Pairing," *Electronics Letters* 39(2):206-208, Jan. 23, 2003.

Amendment filed May 22, 2008 in connection with U.S. Appl. No. 10/990,319, 15 pages.

Amendment filed Dec. 16, 2008 in connection with U.S. Appl. No. 10/990,319, 14 pages.

Amendment filed Apr. 16, 2009 in connection with U.S. Appl. No. 10/990,319, 19 pages.

Office Action relating to U.S. Appl. No. 10/990,319, mailed Feb. 22, 2008, 28 pages.

Office Action relating to U.S. Appl. No. 10/990,319, mailed Aug. 18, 2008, 21 pages.

Office Action relating to U.S. Appl. No. 10/990,319, mailed Jan. 16, 2009, 24 pages.

Office Action dated Aug. 20, 2009, relating to U.S. Appl. No. 10/990,319, 27 pages.

"Key distribution encrypted key SIM phone public-key secret-key mobile 'trusted authority'—Google Scholar," http://scholar.google.com/scholar?as_q=key+distribution+encrypted+key+SIM+phone+public-key+secret..., retrieved Dec. 14, 2009, 3 pages.

"Results (p. 1): (trusted and authority and encrypted and key and public and key and secret and key and m . . . ," http://portal.acm.org/results.cfm?CFID=66732350&CFTOKEN=41157315&adv=1&COLL=ACM&DL=A..., retrieved Dec. 14, 2009, 4 pages.

* cited by examiner

MESSAGE DECIPHERING METHOD, SYSTEM AND ARTICLE

BACKGROUND OF THE INVENTION

1. Field of the Invention

The present disclosure relates to a method for securely transmitting data or digital messages simultaneously to two electronic devices.

2. Description of the Related Art

The transmission of confidential information or messages between two or more electronic devices is known to be achieved by encrypting the messages to be transmitted (and, consequently, deciphering those received) in accordance with cryptographic methods. The exchanged messages which it is desired be made secret or confidential are encrypted by applying appropriate encryption rules and using appropriate encryption keys.

Encryption methods are subdivided into symmetrical or asymmetrical methods depending on whether a message is encrypted and decrypted using a single key (symmetrical secret key) or two distinct keys (a public and a private key), respectively.

For example, one asymmetric method known is the IBE (Identity Based Encryption) method. In accordance with the IBE method, the public key of a user transmitting in an encrypted manner is obtained from the identity of the user (for example the user's tax code) and does not constitute confidential information. The user's private key is secret and is assigned to each user by a unique central authority denominated Trusted Authority TA. Conventional methods for the generation of the public and private keys and the operating characteristics of the trusted authority TA are known to those skilled in the art.

In some applications, it may be useful to securely transmit a message, using the IBE method, simultaneously to two electronic devices.

In accordance with known encryption techniques, the message to be transmitted to both devices is encrypted, sequentially, once with the public key corresponding to the first device and a second time with that corresponding to the second device.

In order to restore the original message, the received encrypted message is, to begin with, decrypted firstly with the private key corresponding to the second device. Subsequently, the result of such decryption is sent to the first device, which decrypts it using its own private key, thus restoring the original message.

In this way, the encrypted message may be decrypted only by using subsequent decryption operations carried out by both devices. Indeed, a single device does not have sufficient information to decrypt the message in question.

In particular, it is observed that the transmitted message, which has been encrypted using encryption keys according to a pre-established order, may only be restored by applying the decryption keys in reverse order with respect to the corresponding encryption keys. That constitutes a limitation for the known encryption methods.

Furthermore, the message to be transmitted simultaneously to two devices requires an encryption step that is taxing from the computational point of view.

BRIEF SUMMARY OF THE INVENTION

In one aspect, a method for decrypting encrypted messages sent by a transmission device to a first electronic device associated with a first trusted authority and to a second electronic device comprises: a) associating a single joint identity with the first and the second electronic devices which is identificative of a common entity comprising the first and the second electronic devices; b) executing, by the transmission device, a single encryption operation of a message in clear by using the joint identity and transmitting the encrypted message simultaneously to the first and the second electronic devices; c) generating, by the first and the second electronic devices a first and a second decryption token, respectively, said tokens being obtained on the basis of quantities provided by at least said first trusted authority; d) providing said first token to the second electronic device and said second token to the first electronic device; and e) generating, by starting from said tokens, by the first and second electronic devices, a joint decryption key in order to decrypt the encrypted message.

In another aspect, a communication system comprises: a first electronic device; and a second electronic device communicatively coupled to the first electronic device, wherein: the first and second electronic devices form a common entity configured to receive an encrypted message and decryption information; the first electronic device is configured to generate a first decryption token based at least in part on the decryption information and to provide the first decryption token to the second electronic device; the second electronic device is configured to generate a second decryption token based at least in part on the decryption information and to provide the second decryption token to the first electronic device; and the common entity is configured to generate a joint decryption key for decrypting the encrypted message based at least in part on the first and second decryption tokens.

In another aspect, a common entity comprises: means for receiving an encrypted message; means for receiving encryption information; a first electronic device having means for generating a first decryption token based at least in part on the received encryption information; a second electronic device coupled to the first electronic device and having means for generating a second decryption-token based at least in part on the received decryption information; and means for generating a joint decryption key based at least in part on the first and second decryption tokens.

In another aspect, a method of decrypting an encrypted message comprises: receiving an encrypted message directed to a common entity; receiving decryption information associated with the common entity; generating a first decryption token based at least in part on the received decryption information; receiving a second decryption token; and generating a joint decryption key based at least in part on the first and second decryption tokens.

In another aspect, an electronic device comprises: means for receiving an encrypted message directed to the electronic device and to a second electronic device; means for receiving decryption information from a first trusted authority; means for generating a first decryption token based at least in part on received decryption information; means for transmitting the first decryption token to the second electronic device; means for receiving a second decryption token from the second electronic device; and means for generating a joint decryption key based at least in part on the first and second decryption tokens.

In another aspect, a computer readable media stores instructions for causing an electronic device to: receive an encrypted message directed to a common entity; receive decryption information associated with the common entity; generate a first decryption token based at least in part on the received decryption information; receive a second decryption token; and generate a joint decryption key based at least in part on the first and second decryption tokens.

BRIEF DESCRIPTION OF THE SEVERAL VIEWS OF THE DRAWINGS

The characteristics and the advantages of the present invention will be understood from the following detailed description of some exemplificative, and in no way limiting, embodiments in relation to the enclosed drawings, in which.

DETAILED DESCRIPTION OF THE INVENTION

It is appropriate to premise that some embodiments described herein provide encrypted communication using keys, which may be carried out in part by using a symmetrical or private key type method, or by using an asymmetrical, preferably identity-based type IBE method. These two methods have characteristics and general properties, which are known to those skilled in the art, but which are not described in detail for reasons of clarity.

Figure 1:
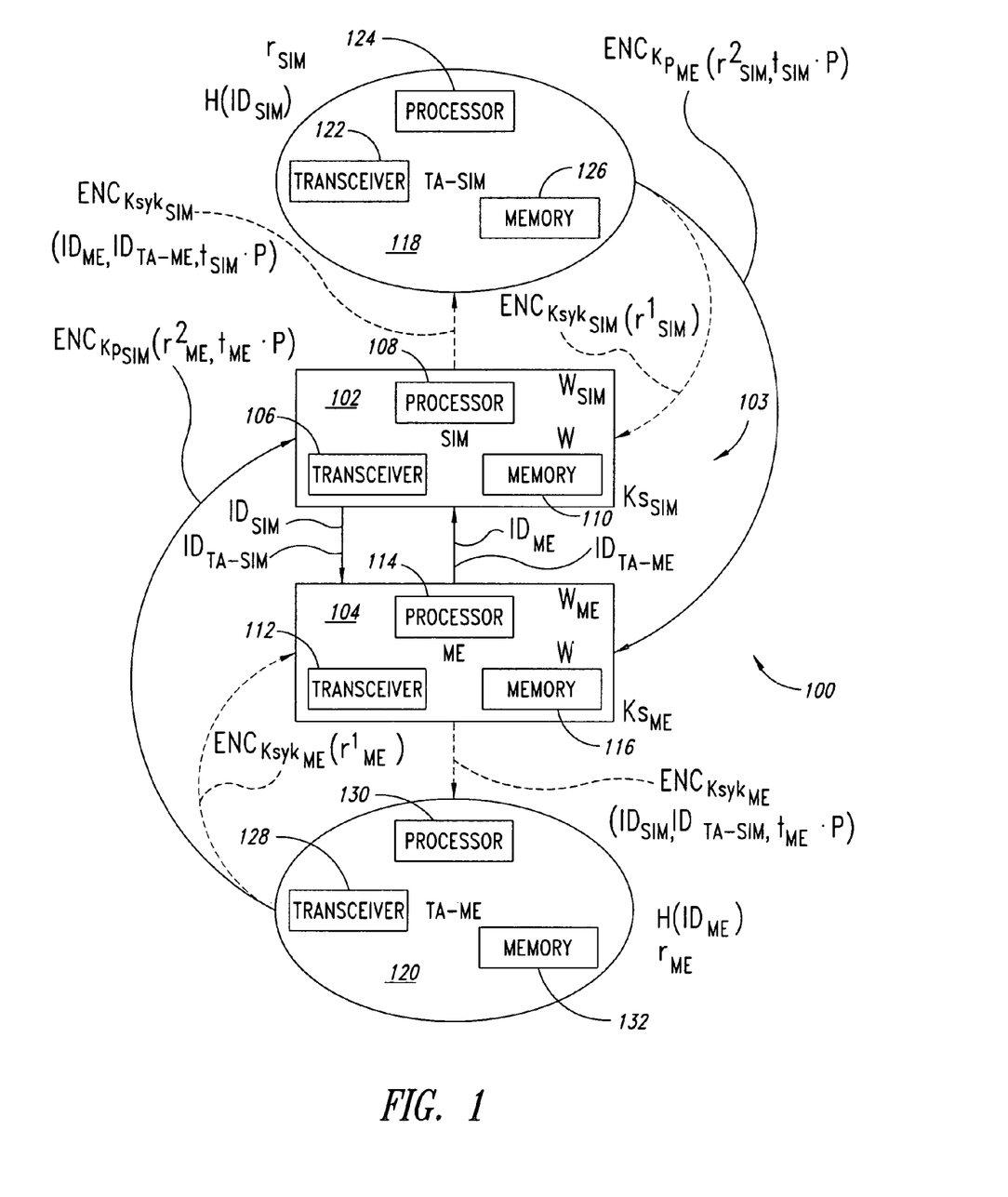
FIG. 1 schematically shows a first embodiment of a communication system and method for enabling the creation of a common identity for devices.

In FIG. 1 is schematically shown a system 100 in accordance with an embodiment of the present invention and comprising a first electronic device SIM 102 and a second electronic device ME 104 intended for jointly communicating encryptedly with a further electronic device (not shown).

Advantageously, embodiments of the present invention are applicable to all types of electronic devices intended for encrypted communication. For example, such devices may be: a smart card associated with a mobile radio communications network user; a mobile telephone which operates within the ambit of a cellular telephone system; a credit card implemented as an additional smart card to be inserted inside the cellular telephone or connected thereto or to another terminal through a wireless communication link. Other types of devices are, for example, a remote internet server or, more particularly, the server of a software update provider.

The first electronic device SIM 102 includes a transceiver 106 for transmitting and receiving messages and data, a processor 108 and a memory 110. Similarly, the second electronic device ME 104 includes a transceiver 112 for transmitting and receiving messages and data, a processor 114 and a memory 116.

A first Trusted Authority TA-SIM 118 and a second Trusted Authority TA-ME 120 are associated with the first electronic device SIM 102 and with the second electronic device ME 104, respectively.

The first TA-SIM 118 and the second TA-ME 120 trusted authorities, which are physically distinct from one another, generate the public and private keys to be associated with the respective devices by using, for example, mathematical schemes, known to those skilled in the art and characteristic, for example, of the identity-based IBE encryption method. The first trusted authority TA-SIM 118 includes a transceiver 122, a processor 124 and a memory 126. Similarly, the second trusted authority TA-ME 120 includes a transceiver 128, a processor 130 and a memory 132.

Each trusted authority is associated with a collection of functions and common parameters, which may be indicated, briefly, for example, by the notation $<G_1, G_2, \hat{e}, P, H, H_1>$. In such notation, for example:

- $G_1$ is an additive group of points of an algebraic curve;
- $G_2$ is a finite multiplicative group;
- $\hat{e}$ is a bilinear function which associates an element of the group $G_2$ with each pair of elements of the additive group $G_1$;
- P is a point of an algebraic curve, i.e., it is an element of the additive group $G_1$;
- H and $H_1$ are, for example, hash type mathematical functions. The first hash function H, when applied to arbitrary strings, converts the latter into elements of the additive group $G_1$. The second hash function $H_1$, when applied to elements of the multiplicative group $G_2$ generates strings of bits of appropriate length.

For the points L, Q, R, $S \in G_1$, i.e., for a four-membered group of elements of the additive group $G_1$, the following equality applies:

$$\hat{e}(L+Q, R+S) = \hat{e}(L,R) \cdot \hat{e}(L,S) \cdot \hat{e}(Q,R) \cdot \hat{e}(Q,S) \qquad (1)$$

The operator "·" represents an external product in additive group $G_1$. Such external product is definable as follows:

$$x \cdot y \to z, x \in \{1, 2, \ldots, \text{ord}(G1)-1\} \qquad (2)$$

$$y, z \in G1;$$

where "ord" is the number of elements of the group $G_1$.

In addition, if a and b are two integers and L and Q are points belonging to group $G_1$ then the following equation is valid:

$$\hat{e}(a \cdot L, b \cdot Q) = \hat{e}(L,Q)^{ab} \qquad (3)$$

Each device recognizes the functions and parameters which characterize the corresponding trusted authority.

During the initialization procedure of the embodiment of FIG. 1, each electronic device 102, 104 acquires from the corresponding trusted authority 118, 120, information useful for the subsequent decryption. Such information is stored within appropriate memory 110, 116 with which the devices 102, 104 are equipped.

In such a manner, for example, the first device SIM 102 recognizes a first identity $ID_{SIM}$ associated with it and a further first identity $ID_{TA-SIM}$ from the first trusted authority TA-SIM 118. Analogously, the second device ME 104 recognizes a second identity $ID_{ME}$ and a further second identity $ID_{TA-ME}$ from the second trusted authority TA-ME 120. Such identities are strings of bits or characters which unambiguously identify the first device SIM 102 and the second device ME 104, the first TA-SIM 118 and the second TA-ME 120 trusted authorities, and in general do not represent confidential information.

The first TA-SIM 118 and the second TA-ME 120 authorities also possess a first $s_{TA-SIM}$ and a second $S_{TA-ME}$ master key, respectively. Such first $s_{TA-SIM}$ and second $S_{TA-ME}$ master keys are generally distinct from one another, and each is kept secret from the other trusted authority.

The first device SIM 102 recognizes (and stores within the memory 110) a first public key $Kp_{SIM}$, a first intermediate key $Ki_{SIM}$ and a first secret key $Ksyk_{SIM}$. The first public key $Kp_{SIM}$ is obtained by applying the first hash function H to the first identity $ID_{SIM}$ and is also shown as $H(ID_{SIM})$. The first intermediate key $Ki_{SIM}$ is a private or secret key obtained by applying the first master key $s_{TA-SIM}$ to the aforesaid public key $H(ID_{SIM})$ in accordance, for example, with the following expression:

$$Ki_{SIM} = s_{TA-SIM} \cdot Kp_{SIM} \qquad (4)$$

The first secret key $Ksyk_{SIM}$ is obtained by applying a further hash function to the first intermediate key $Ki_{SIM}$.

Analogously, the second device ME 104 recognizes (and stores within the memory 116) a second public key $Kp_{ME}$, a second intermediate key $Ki_{ME}$ and a second secret key $Ksyk_{ME}$. Such keys are obtained by using procedures which are analogous to those described in relation to the first device SIM 102.

The first $Ksyk_{SIM}$ and the second $Ksyk_{ME}$ secret keys allow the accomplishment of the symmetric, encrypted communication between each device and the corresponding Trusted Authority.

The electronic devices SIM 102, and ME 104 themselves might autonomously generate the first $Ksyk_{SIM}$ and the second $Ksyk_{ME}$ secret keys by starting from the first $Ki_{SIM}$ and from the second $Ki_{ME}$ intermediate keys respectively, each and every time it is made necessary to communicate symmetrically with the respective Authority. In such a case, each device 102, 104 can recognize, besides the previously mentioned hash functions, a further hash function arranged with the corresponding trusted authority which allows the transformation of the intermediate key ($Ki_{SIM}$, $Ki_{ME}$) into the corresponding secret key ($Ksyk_{SIM}$, $Ksyk_{ME}$). In such a manner, memorizing such secret keys within the corresponding devices during the initialization phase can be avoided.

Alternatively, the first $Ksyk_{SIM}$ and the second $Ksyk_{ME}$ secret keys may be directly pre-arranged by each Trusted Authority 118, 120 and assigned to the corresponding device SIM 102 and ME 104, without carrying out any processing of the intermediate keys.

It is observed that in the preceding acquisition step of the identities and of the public and private keys, the first SIM 102 and the second ME 104 devices are not connected to one another yet. Regarding this, it is assumed that such devices are directly connected when, for example, a smart card is inserted within a mobile equipment in such a manner that the first SIM 102 and the second ME 104 device are in electronic contact with one another.

Alternatively, the first SIM 102 and the second ME 104 devices may be connected together over a distance by using appropriate means of transmission (e.g., mobile radio communication networks).

Subsequent to being connected, each electronic device transmits its own identity and the identity of its own trusted authority to the other. For example, the first-device SIM 102 sends its own first identity $ID_{SIM}$ and the further first identity $ID_{TA-SIM}$ of the first trusted authority TA-SIM to the second device ME 104, and vice versa as shown schematically in FIG. 1.

It is observed that an embodiment of the method of the invention allows the creation of a common or joint identity associated with the first SIM 102 and the second ME 104 device, which form a common entity 103. In this way, each encrypted message to be transmitted simultaneously to such devices is sent to the aforesaid joint identity in order to be jointly decrypted by both. The characteristic properties of the joint identity and the joint decryption methods of an embodiment will be described in the following.

Furthermore, the method of an embodiment of the invention allows the creation of a secure communication channel between the devices. In particular, the method of an embodiment of the invention provides for the generation of session keys, which are usable by the first SIM 102 and by the second ME 104 device as secret keys in order to establish a symmetrical type encrypted communication with one another. In other words, such secret session keys will be used, during a communication session, in order to encrypt and decrypt all the subsequent messages exchanged between the two devices.

Advantageously, the generation of the session keys actualizes a reciprocal authentication of the two devices SIM 102 and ME 104.

The method of the invention will be discussed in more detail with respect to several embodiments for enabling the devices for the joint decryption of the messages and, simultaneously, generating the secret session keys.

With reference to FIG. 1 the following embodiments of the method of the invention will be described.

In this case, it is observed, first of all, that the transmission of symmetrically encrypted messages is easily applicable between each electronic device and the corresponding trusted authority. Indeed, the first/second trusted authority TA-SIM/TA-ME shares the first/second secret key $Ksyk_{SIM}$/$Ksyk_{ME}$ with the first/second device SIM/ME.

Furthermore, embodiments of the invention may include the transmission of further information in addition to that contained within the messages which will be explicitly described in the following.

Subsequent to the reciprocal exchange of identities, the first device SIM 102 generates a first numerical value $t_{SIM}\cdot P$ by carrying out operation (2) between a first number $t_{SIM}$ which it has generated-randomly and the point P of the additive group $G_1$. Analogously, the second device ME 104 generates a second numerical value $t_{ME}\cdot P$ by carrying out the same operation (2) between a second number $t_{ME}$ (generated randomly) and the same point P.

In relation to FIG. 1, the first device SIM 102 transmits to the first trusted authority TA-SIM 118 a message containing the second identity $ID_{ME}$, the further second identity $ID_{TA-ME}$ (the first device SIM 102 has received such identities from the second device ME 104 in the preceding step) and the first numerical value $t_{SIM}\cdot P$. Prior to being transmitted, such identities and such a numerical value are encrypted using the first secret key $Ksyk_{SIM}$ so that the first trusted authority TA-SIM 118 may decrypt them with the same key in accordance with the above mentioned symmetrical encryption method.

In greater detail, the message which is transmitted contains the identities encrypted in accordance with the following notation, which is also indicated in FIG. 1:

$$ENC_{Ksyk_{SIM}}(ID_{ME}, ID_{TA-ME}, t_{SIM}\cdot P) \quad (5)$$

wherein, by ENC is indicated the encryption operation carried out on the second $ID_{ME}$ identity, on the further second $ID_{TA-ME}$ identity, and on the first numerical value $t_{SIM}\cdot P$ using the key $Ksyk_{SIM}$. Such an encryption operation is carried out in accordance with the pre-selected, symmetrical key cryptography algorithm.

The first authority TA-SIM 118 decrypts the message received in accordance with the notation (not shown in FIG. 1)

$$DEC_{Ksyk_{SIM}}(ENC_{Ksyk_{SIM}}(ID_{ME}, ID_{TA-ME}, t_{SIM}\cdot P)) \quad (6)$$

wherein, with DEC is indicated the decryption operation carried out on (5) by using the key $Ksyk_{SIM}$. Such a decryption operation allows the first trusted authority TA-SIM 118 to recognize (i.e., store in an appropriate memory, such as memory 126) the second $ID_{ME}$ and the further second $ID_{TA-ME}$ identities. In other words, the first trusted authority TA-SIM 118 is informed about the typology of the second device ME 104 (for example the type of mobile communication equipment) and about other data relating to the second trusted authority TA-ME 120. In particular, after having acquired the second $ID_{ME}$ identity, the first trusted authority TA-SIM 118 is able to generate (and therefore to store) the second public key $Kp_{ME}$ associated with the second device ME 104. The first trusted authority TA-SIM 118 applies the first hash function H (common to both trusted authorities) to the second identity $ID_{ME}$ in order to generate said public key $Kp_{ME}$ or $H(ID_{ME})$. Furthermore, by decrypting the message received, the first trusted authority TA-SIM 118 recognizes (and stores within an appropriate memory, such as memory 126) the first numerical value $t_{SIM}\cdot P$.

Subsequently, the first trusted authority TA-SIM 118 generates a first random number $r_{SIM}$ which, in particular, is an integer. Using such random number $r_{SIM}$, the first trusted authority TA-SIM 118 generates a first quantity $r^1_{SIM}$ and a second quantity $r^2_{SIM}$ by starting from the first $H(ID_{SIM})$ and the second $H(ID_{ME})$ public keys, respectively. In particular, such quantities are calculated in accordance with the following expressions:

$$r^1_{SIM} = r_{SIM} \cdot H(ID_{SIM}) \quad (7)$$

$$r^2_{SIM} = r_{SIM} \cdot H(ID_{ME}) \quad (8)$$

The first quantity $r^1_{SIM}$ is encrypted by using the first secret key $Ksyk_{SIM}$ and sent as a message to the first device SIM 102 by the first trusted authority TA-SIM 118. The message which is sent contains the first quantity $r^1_{SIM}$, encrypted symmetrically in accordance with the following notation (analogous in type to notation (5)), which is also indicated in FIG. 1:

$$ENC_{Ksyk_{SIM}}(r^1_{SIM}) \quad (9)$$

The message, in accordance with notation (9), is received and decrypted (with the same secret key $Ksyk_{SIM}$) by the first device SIM 102. This takes place in accordance with the following notation (analogous to (6) and itself also not indicated in FIG. 1)

$$DEC_{Ksyk_{SIM}}(ENC_{Ksyk_{SIM}}(r^1_{SIM})) \quad (10)$$

It is observed that if the first device SIM 102 is able to decrypt such a message received from the first trusted authority TA-SIM 118, with the first secret key $Ksyk_{SIM}$, it is automatically authenticated, i.e., it is not possible that a clone is substituting it.

In such a manner, the first device SIM 102 may recognize (and store in an appropriate memory, such as memory 110) the first quantity $r^1_{SIM}$.

Alternatively, the encryption and decryption operations associated with the transmission of the first quantity $r^1_{SIM}$ to the first device SIM 102, may be carried out, not according to the symmetrical method, but by using the IBE type asymmetric method. In such a case, the encryption key used is the first public key $Kp_{SIM}$ and the decryption key is the first intermediate key $Ki_{SIM}$. Both these keys are known to the first authority TA-SIM 118 in as much as they have been generated by it itself.

Furthermore, the first trusted authority TA-SIM 118 sends a message containing the second quantity $r^2_{SIM}$ and the first numerical value $t_{SIM}\cdot P$ to the second device ME 104. In this case, such a message is encrypted in accordance with the asymmetric IBE method, i.e., it is in accordance with the following notation, (also indicated in FIG. 1):

$$ENC_{K_{PME}}(r^2_{SIM}, t_{SIM}\cdot P) \quad (11)$$

which expresses the fact that the encryption is carried out by using the second public key $Kp_{ME}$.

The second device ME 104 decrypts (11) by using the second intermediate key $Ki_{ME}$ in accordance with the notation:

$$DEC_{Ki_{ME}}(ENC_{K_{PME}}(r^2_{SIM}, t_{SIM}\cdot P)) \quad (12)$$

In such a manner, the second device ME 104 recognizes (and stores within a memory, such as the memory 116) the second quantity $r^2_{SIM}$ and the first numerical value $t_{SIM}\cdot P$.

It is observed that if the second device ME 104 is able to decrypt (11) received from the first trusted authority TA-SIM 118 with its own second intermediate key $Ki_{ME}$, it is automatically authenticated, i.e., it is not a clone.

Still in reference to FIG. 1, an embodiment of the inventive method also provides for an exchange of encrypted messages which involves the second device ME 104 and the second trusted authority TA-ME 120 in a way which exactly mirrors that described previously.

In particular, the second device ME 104 transmits a message containing the first identity $ID_{SIM}$, the further first identity $ID_{TA-SIM}$ (which it has received from the first device SIM 102 in the preceding step) and the second numerical value $t_{ME}\cdot P$ to the second trusted authority TA-ME 120. Prior to being transmitted, such identities and such a numerical value are encrypted by using the second secret key $Ksyk_{ME}$ so that the second trusted authority TA-ME 120 may decrypt them by using the same key in accordance with the symmetrical encryption method.

In greater detail, the message which is transmitted contains the identities encrypted in accordance with the following notation (also indicated in FIG. 1):

$$ENC_{Ksyk_{ME}}(ID_{SIM}, ID_{TA-SIM}, t_{ME}\cdot P) \quad (13)$$

wherein, by ENC is indicated the encryption operation carried out on the identities $ID_{ME}$, $ID_{TA-ME}$ and on the second numerical value $t_{ME}\cdot P$, by using the key $Ksyk_{ME}$.

The second trusted authority TA-ME 120 decrypts the message received in accordance with the notation (not shown in FIG. 1)

$$DEC_{Ksyk_{ME}}(ENC_{Ksyk_{ME}}(ID_{SIM}, ID_{TA-SIM}, t_{ME}\cdot P)) \quad (14)$$

wherein, with DEC is indicated the decryption operation carried out on (13) by using the key $Ksyk_{ME}$.

Such a decryption operation allows the second trust authority TA-ME 120 to recognize (i.e., store in an appropriate memory, such as the memory 132) the first $ID_{SIM}$ and the further first $ID_{TA-SIM}$ identities. In other words, the second trusted authority TA-ME 120 is informed about the typology of the first device SIM 102 and about the first trusted authority TA-SIM 118. In particular, after having acquired the first identity $ID_{SIM}$, the second trusted authority TA-ME 120 is able to generate (and therefore to store) the first public key $H(ID_{SIM})$ associated with the first device SIM 102. Furthermore, by decrypting the message received, the second trusted authority TA-ME 120 recognizes (and stores within an appropriate memory, such as the memory 132) the second numerical value $t_{ME}\cdot P$.

Subsequently, the second trusted authority TA-ME 120 generates a second random number $r_{ME}$ which, in particular, is an integer. The second trusted authority TA-ME 120 generates a third quantity $r^1_{ME}$ and a fourth quantity $r^2_{ME}$ using such random number $r_{ME}$ by starting from the second $H(ID_{ME})$ and from the first $H(ID_{SIM})$ public keys, respectively. In particular, such quantities are calculated in accordance with the following expressions:

$$r^1_{ME} = r_{ME} \cdot H(ID_{ME}) \quad (15)$$

$$r^2_{ME} = r_{ME} \cdot H(ID_{SIM}) \quad (16)$$

The third quantity $r^1_{ME}$ is encrypted by using the second secret key $Ksyk_{ME}$ and sent as a message to the second device ME 104 by the second trusted authority TA-ME 120. The message sent is in accordance with the following notation which is also indicated in FIG. 1:

$$ENC_{Ksyk_{ME}}(r^1{}_{ME}) \quad (17)$$

The message (17) is received and decrypted (by using the same secret key $Ksyk_{ME}$) by the second device ME 104. That comes about in accordance with the following notation (not indicated in FIG. 1)

$$DEC_{Ksyk_{ME}}(ENC_{Ksyk_{ME}}(r^1{}_{ME})) \quad (18)$$

It is observed that if the second device ME 104 is able to decrypt such a message received from the second trusted authority TA-ME 120, by using the second secret key $Ksyk_{ME}$, it is automatically authenticated, i.e., it is not possible that a clone is substituting it.

In such a manner, the second device ME 104 may recognize (and store in an appropriate memory, such as the memory 116) the third quantity $r^1{}_{ME}$.

Alternatively, the encryption and decryption operations associated with the transmission of the third quantity $r^1{}_{ME}$ to the second device ME 104, may be carried out, not according to the symmetrical method, but by using the IBE type asymmetric method. In such a case, the encryption key used is the second public key $Kp_{ME}$ and the decryption key is the second intermediate key $Ki_{ME}$. Both these keys are known to the second trusted authority TA-ME 120 in as much as they have been generated by it itself.

Furthermore, the second trusted authority TA-ME 120 sends a message containing the fourth quantity $r^2{}_{ME}$ and the second numerical value $t_{ME} \cdot P$ to the first device SIM 102. In this case, such a message is encrypted in accordance with the asymmetric IBE method, i.e., it is in accordance with the following notation, (also indicated in FIG. 1):

$$ENC_{Kp_{SIM}}(r^2{}_{ME}, t_{ME} \cdot P) \quad (19)$$

which expresses the fact that the encryption is carried out by using the first public key $Kp_{SIM}$.

The first device SIM 102 decrypts (19) by using the first intermediate key $Ki_{SIM}$ in accordance with the notation:

$$DEC_{Ki_{SIM}}(ENC_{Kp_{SIM}}(r^2{}_{ME}, t_{ME} \cdot P)) \quad (20)$$

In such a manner, the second device ME 104 recognizes (and stores within a memory space, such as the memory 116) the fourth quantity $r^2{}_{ME}$ and the second numerical-value $t_{ME} \cdot P$.

It is observed that if the first device SIM 102 is able to decrypt (20) received from the second trusted authority TA-ME 120 with its own first intermediate key $Ki_{SIM}$, it is automatically authenticated, i.e., it is not a clone.

Through the information received from the trusted authorities, TA-SIM 118 and TA-ME 120, the first SIM 102 and the second ME 104 devices are able to generate the corresponding secret session keys. It is observed that such keys may be generated in accordance with alternative forms of generation, by using different mathematical schemes.

In particular, in accordance with a first form of generation of the session keys, the first device SIM 102 generates its own secret session key as an external product (analogous to (2)) between the second numerical value $t_{ME} \cdot P$ acquired and the first number $t_{SIM}$ (which has been generated randomly and stored previously by the same device SIM 102). Analogously, the second device ME 104 generates its own secret session key as an external product between the first numerical value $t_{SIM} \cdot P$ acquired and the second number $t_{ME}$ (which has been randomly generated and stored previously by the same device ME 104).

The aforesaid products are in accordance with the equalities:

$$Ks_{SIM} = t_{SIM} \cdot (t_{ME} \cdot P) \quad (21)$$

$$Ks_{ME} = t_{ME} \cdot (t_{SIM} \cdot P) \quad (22)$$

It is observed, in particular, that the secret session keys $Ks_{SIM}$ and $Ks_{ME}$ thus generated, are identical for both devices.

Alternatively, a second form of generation of the session keys provides that such keys may be generated by starting from the quantities which the first SIM 102 and the second ME 104 devices have received from the trusted authorities, TA-SIM 118 and TA-ME 120.

In particular, in a first instant, the first device SIM 102 carries out a first operation by applying the bilinear function $\hat{e}$ to the second public key $H(ID_{ME})$ and to the sum of the first quantity $r^1{}_{SIM}$ and the fourth quantity $r^2{}_{ME}$. Subsequently, the first device SIM 102 applies the second hash function $H_1$ to the result of such an operation thus obtaining its own secret session key $Ks_{SIM}$ which is in accordance with the following notation:

$$Ks_{SIM} = H_1(\hat{e}(H(ID_{ME}), r^1{}_{SIM} + r^2{}_{ME})) \quad (23)$$

Analogously, the second device ME 104 carries out, initially, a first operation by applying the bilinear function $\hat{e}$ to the first public key $H(ID_{SIM})$ and to the sum of the third quantity $r^1{}_{ME}$ and the second quantity $r^2{}_{SIM}$. Subsequently, the second device ME g104 applies the second hash function $H_1$ to the result of such operation thus obtaining its own secret session key $Ks_{ME}$. Such session key is in accordance with the notation:

$$Ks_{ME} = H(\hat{e}(r^1{}_{ME} + r^2{}_{SIM}, H(ID_{SIM}))) \quad (24)$$

Thus obtained, the secret session keys $Ks_{SIM}$ and $Ks_{ME}$ are identical. Indeed, by starting from (15) and from (8), the equality (24) corresponds to:

$$Ks_{ME} = H_1(\hat{e}(r_{ME} \cdot H(ID_{ME}) + r_{SIM} \cdot H(ID_{ME}), H(ID_{SIM}))) \quad (25)$$

and this latter may be expressed, taking (4) into account, as $$Ks_{ME} = H_1(\hat{e}(H(ID_{ME}), H(ID_{SIM}))^{(r_{ME} + r_{SIM})}) \quad (26)$$

It is observed that, still on the basis of (3), (26) also corresponds to:

$$Ks_{ME} = H_1(\hat{e}(H(ID_{ME}), r_{SIM} \cdot H(ID_{SIM}) + r_{ME} \cdot H(ID_{SIM}))) \quad (27)$$

i.e., to $$Ks_{ME} = H_1(\hat{e}(H(ID_{ME}), r^1{}_{SIM} + r^2{}_{ME})) \quad (28)$$

As observed, (28) coincides with (23), and hence the secret session key of the second device ME 104 coincides with that of the first device SIM 102.

Furthermore, it is observed that in the embodiment of the method of the invention described above, the information transmitted by the trusted authorities, TA-SIM 118 and TA-ME 120, to the devices, SIM 102 and ME 104, such as, for example, the quantities $r^1{}_{SIM}$, $r^2{}_{SIM}$, $r^1{}_{ME}$ and $r^2{}_{ME}$ enable the devices themselves for the joint decryption of a generic message addressed to both and encrypted using their joint identity, as will be described below.

Figure 2:
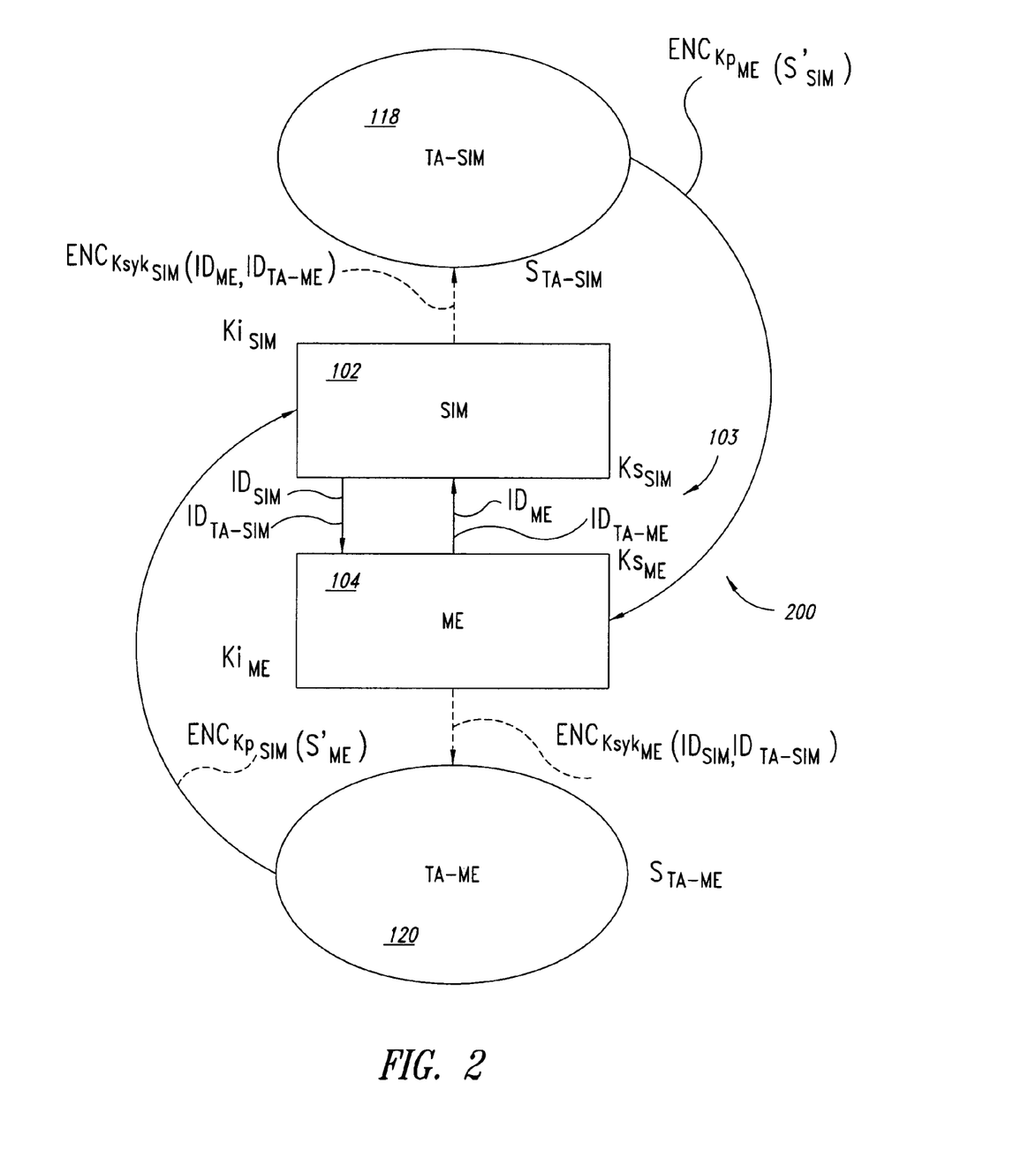
FIG. 2 schematically shows a second embodiment of a communication system and method for enabling the creation of a common identity for devices.

With reference to FIG. 2, additional embodiments of the method of the invention will be described, which enables the devices both for the joint decryption of messages, and for the generation of the secret session keys.

The elements represented in FIG. 2 which have already been introduced in FIG. 1, will be indicated by using the same references. Some details illustrated in FIG. 1 are omitted from FIG. 2 for clarity. The system 200 of FIG. 2 comprises the first SIM 102 and the second ME 104 devices, to which are associated the first TA-SIM 118 and the second TA-ME 120 trusted authorities, respectively.

Also, within such second embodiments of the method is foreseen, the exchange of their corresponding identities between the devices, i.e., $ID_{SIM}$, $ID_{TA-SIM}$ from SIM 102 to ME 104 and $ID_{ME}$, $ID_{TA-ME}$ from ME 104 to SIM 102, as shown schematically in FIG. 2. As already described above, the aforesaid exchange of identities occurs following the connection of the two devices.

Afterwards, the first device SIM 102 transmits a message containing the second identity $ID_{ME}$ and the further second identity $ID_{TA-ME}$, received from the second device ME 104, to the first trusted authority TA-SIM 118. Prior to being transmitted, such identities are encrypted using the first secret key $Ksyk_{SIM}$ so that the first trusted authority TA-SIM 118 may decrypt them with the same key, in accordance with the aforementioned symmetrical encryption method.

In greater detail, the message which is transmitted contains the identities encrypted in accordance with the following notation (also indicated in FIG. 2):

$$ENC_{Ksyk_{SIM}}(ID_{ME}, ID_{TA-ME}) \quad (29)$$

wherein, by ENC is indicated the encryption operation carried out on the second $ID_{ME}$ and on the further second $ID_{TA-ME}$ identities, using the key $Ksyk_{SIM}$.

The first trusted authority TA-SIM 118 decrypts the message received in accordance with the notation (not shown in FIG. 2)

$$DEC_{Ksyk_{SIM}}(ENC_{Ksyk_{SIM}}(ID_{ME}, ID_{TA-ME})) \quad (30)$$

wherein, with DEC is indicated the decryption operation carried out on (29) by using the same key $Ksyk_{SIM}$. Such a decryption operation allows the first trusted authority TA-SIM 118 to recognize (i.e., store in an appropriate memory (see, e.g., memory 126 of FIG. 1)) the second $ID_{ME}$ and the further second $ID_{TA-ME}$ identities. Consequently, the first trusted authority TA-SIM 118 is able to generate (and hence store) the second public key $Kp_{ME}$ associated with the second device ME 104. In greater detail, the first trusted authority TA-SIM 118 applies the first hash function H to the second identity $ID_{ME}$ in order to generate said public key $Kp_{ME}$ (or $H(ID_{ME})$).

Subsequently, the first trusted authority TA-SIM 118 generates a further first quantity $s'_{SIM}$ by using the first master key $s_{TA-SIM}$ and the second public key $H(ID_{ME})$. In particular, such further first quantity $s'_{SIM}$ is calculated in accordance with the expression:

$$s'_{SIM} = s_{TA-SIM} \cdot H(ID_{ME}) \quad (31)$$

The first trusted authority TA-SIM 118 sends a message containing the further first quantity $s'_{SIM}$ to the second device ME 104. In this case, such message is encrypted in accordance with the asymmetric IBE method, i.e., it is in accordance with the following notation, (also indicated in FIG. 2):

$$ENC_{Kp_{ME}}(s'_{SIM}) \quad (32)$$

which expresses the fact that the encryption is carried out by using the second public key $Kp_{ME}$.

The second device ME 104 decrypts (32) by using the second intermediate key $Ki_{ME}$ in accordance with the notation:

$$DEC_{Ki_{ME}}(ENC_{Kp_{ME}}(s'_{SIM})) \quad (33)$$

In such a way, the second device ME 104 recognizes (and stores within a memory space (see, e.g., memory 116 of FIG. 1)) the further first quantity $s'_{SIM}$.

It is observed that if the second device ME 104 is able to decrypt (32) received from the first trusted authority TA-SIM 118 with its own second intermediate key $Ki_{ME}$, it is automatically authenticated, i.e., it is not a clone.

Still with reference to FIG. 2, embodiments of the method of the invention also provide for an exchange of the encrypted messages which involves the second device ME 104 and the second trusted authority TA-ME 120.

In particular, the second device ME 104 transmits a message containing the first identity $ID_{SIM}$ and the further first identity $ID_{TA-SIM}$, received in the preceding step from the first device SIM 102, to the second trusted authority TA-ME 120. Prior to being transmitted, such identities and such numerical value are encrypted using the second secret key $Ksyk_{ME}$ so that the second trusted authority TA-ME 120 may decrypt them by using the same key, in accordance with the symmetrical encryption method.

In greater detail, the message which is transmitted contains the identities encrypted in accordance with the following notation (also indicated in FIG. 1):

$$ENC_{Ksyk_{ME}}(ID_{SIM}, ID_{TA-SIM}) \quad (34)$$

The second trusted authority TA-ME 120 decrypts the message received in accordance with the notation (not shown in FIG. 2)

$$DEC_{Ksyk_{ME}}(ENC_{Ksyk_{ME}}(ID_{SIM}, ID_{TA-SIM})) \quad (35)$$

Such a decryption operation allows the second trusted authority TA-ME 120 to recognize (i.e., store in an appropriate memory (see, e.g., memory 132 of FIG. 1)) the first $ID_{SIM}$ and the further first $ID_{TA-SIM}$ identities. Furthermore, after having acquired the first identity $ID_{SIM}$, the second trusted authority TA-ME 120 is able to generate (and hence to store) the first public key $H(ID_{SIM})$ associated with the first device SIM 118.

Subsequently, the second trusted authority TA-ME 120 generates a further second quantity $s'_{ME}$ by using the second master key $s_{TA-ME}$ and the first public key $H(ID_{SIM})$. In particular, such further second quantity $s'_{ME}$ is calculated in accordance with the expression:

$$s'_{ME} = s_{TA-ME} \cdot H(ID_{SIM}) \quad (36)$$

The second trusted authority TA-ME 120 sends a message containing the further second quantity $s'_{ME}$ $s'_{ME}$ to the first device SIM 102. In this case, such message is encrypted in accordance with the asymmetric IBE method, i.e., it is in accordance with the following notation, (also indicated in FIG. 2):

$$ENC_{Kp_{SIM}}(s'_{ME}) \quad (37)$$

which expresses the fact that the encryption is carried out by using the first public key $Kp_{SIM}$.

The first device SIM 102 decrypts the (37) by using the first intermediate key $Ki_{SIM}$ in accordance with the notation:

$$DEC_{Ki_{SIM}}(ENC_{Kp_{SIM}}(s'_{ME})) \quad (38)$$

In such a way, the second device ME 104 recognizes (and stores within memory space (see, e.g., memory 116 of FIG. 1)) the further second quantity $s'_{ME}$.

It is observed that if the first device SIM 102 is able to decrypt (37) received from the second trusted authority TA-ME 120 with its own intermediate key $Ki_{SIM}$, it is automatically authenticated, i.e., it is not a clone.

Through the information received from the trusted authorities, the first SIM 102 and the second ME 104 devices are able to generate the corresponding secret session keys.

In particular, the first device SIM 102 performs a first operation by applying the bilinear function ê to the second public key $H(ID_{ME})$ and to the sum of the first intermediate key $Ki_{SIM}$ and the further second quantity $s'_{ME}$, received from the second trusted authority TA-ME 120. Subsequently, the first device SIM 102 applies the second hash function $H_1$ to the result of such an operation thus obtaining its own secret session key $Ks_{SIM}$ which is in accordance with the following notation:

$$Ks_{SIM}=H_1(\hat{e}(H(ID_{ME}),Ki_{SIM}+s'_{ME})) \quad (39)$$

Analogously, the second device ME 104 initially carries out a first operation, by applying the bilinear function ê to the first public key $H(ID_{SIM})$ and to the sum of the second intermediate key $Ki_{ME}$ and the further first quantity $s'_{SIM}$. Subsequently, the second device ME 104 applies the second hash function $H_1$ to the result of such an operation thus obtaining its own secret session key $Ks_{ME}$, in accordance with the following notation:

$$Ks_{ME}=H_1(\hat{e}(Ki_{ME}+s'_{SIM},H(ID_{SIM}))) \quad (40)$$

The secret session keys $Ks_{SIM}$ and $Ks_{ME}$ thus generated are identical. That is demonstrable if one proceeds in a manner analogous to that described in relation to the session key generation of the embodiment of the method of the invention discussed above with respect to equations (25) to (28).

In particular, it is observed that in the embodiments of the method discussed with respect to FIG. 2, the information transmitted from the trusted authorities to the devices such as, for example, the further quantities $s'_{SIM}$ and $s'_{ME}$ and the intermediate keys $Ki_{SIM}$ and $Ki_{ME}$, enable the devices themselves for joint decryption. Hence, such quantities are analogous to those introduced in the embodiments described with respect to FIG. 1.

Figure 3:
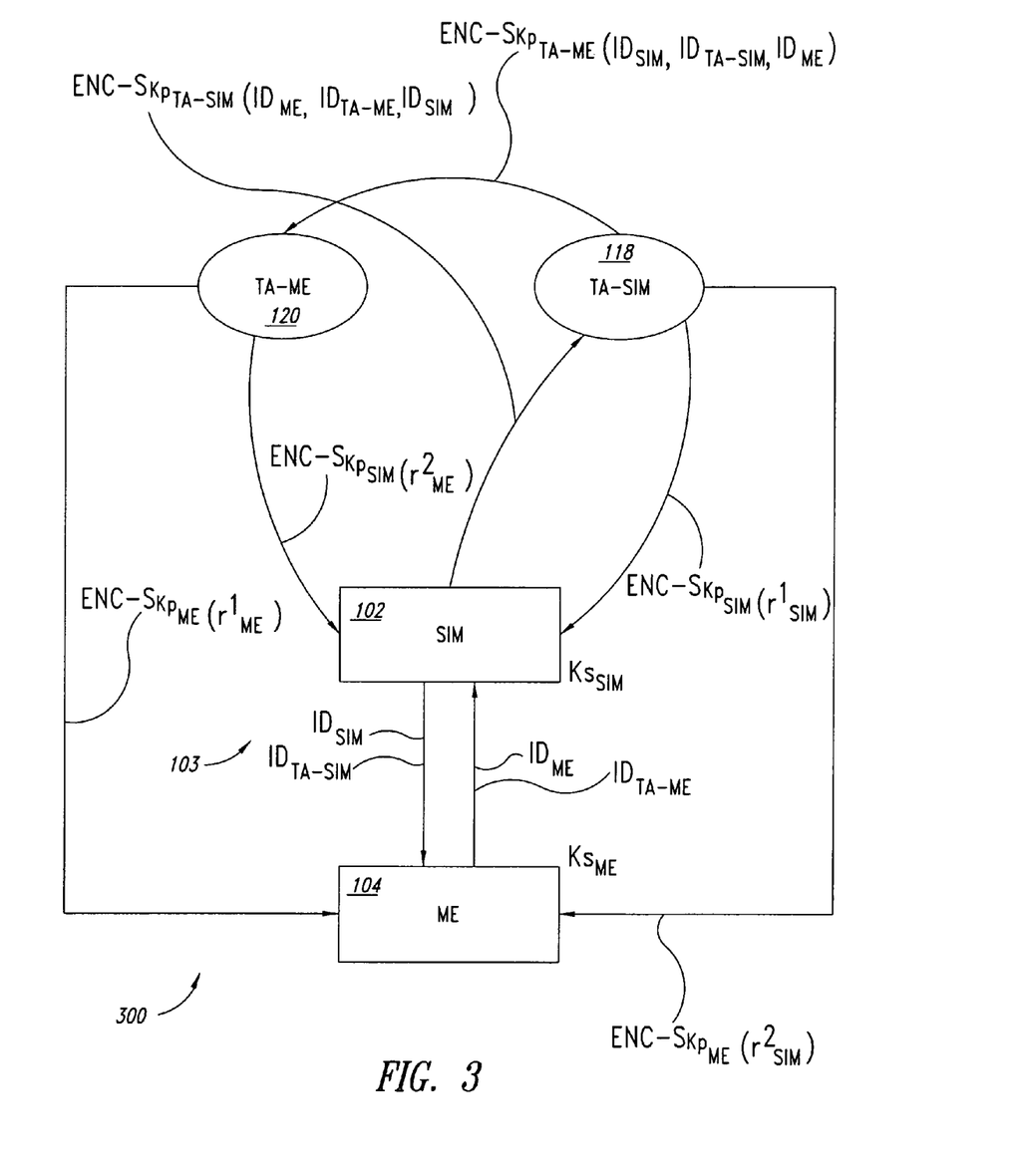
FIG. 3 schematically shows a third embodiment of a communication system and method for enabling the creation of a common identity for devices.

With reference to FIG. 3 additional embodiments of the method of the invention will be described.

In particular, a system 300 comprising the devices SIM 102, ME 104 and the trusted authorities TA-SIM 118, TA-ME 120 is represented schematically in FIG. 3. As will be described below, all the messages exchanged between the devices and the trusted authorities will be encrypted in accordance with the asymmetrical IBE method, hence distinct encryption and decryption keys will be used.

Analogously to the previous embodiments described with respect to FIG. 2, following the connection of the devices, the first device SIM 102 sends the first $ID_{SIM}$ and the further first $ID_{TA-SIM}$ identities to the second device ME 104. In dual mode, the second device ME 104 sends the second $ID_{ME}$ and the further second $ID_{TA-ME}$ identities to the first device SIM 102, as shown schematically in FIG. 3.

The first device SIM 102 transmits a message containing the second identity $ID_{ME}$ and the further second identity $ID_{TA-ME}$, received from the second device ME 104, to the first trusted authority TA-SIM 118. Optionally, the first device SIM 102 also transmits its own identity $ID_{SIM}$ within such a message in order to allow it to be identified rapidly from amongst the numerous different devices associated with the first trusted authority TA-SIM 118.

Advantageously, the first device SIM 102 sends such a message by encrypting it with the further first public key $Kp_{TA-SIM}$ in accordance with the asymmetric IBE method.

However, it is observed that in this case the encryption operation also includes an electronic signature of the message sent.

For the calculation of the signature, the first device SIM 102 applies a hash function $H_F$ to the previous identities $ID_{ME}$, $ID_{TA-ME}$, $ID_{SIM}$ in such a way as to obtain a digest $H_F(ID_{ME}, ID_{TA-ME}, ID_{SIM})$ of the aforesaid identities. Such a hash function $H_F$ may coincide with the first hash function H or with the second hash function $H_1$, introduced previously, or may be a different hash function. However, the devices and the trusted authorities must be in agreement regarding the use of the same function $H_F$ for the calculation of the digest.

The digest $H_F(ID_{ME}, ID_{TA-ME}, ID_{SIM})$ is encrypted by using the first intermediate key $Ki_{SIM}$ thus obtaining the digital signature of the message containing the identities $ID_{ME}$, $ID_{TA-ME}$, $ID_{SIM}$. Such signature is indicated by:

$$ENC_{Ki_{SIM}}(H_F(ID_{ME},ID_{TA-ME},ID_{SIM})) \quad (41)$$

The message sent to the first trusted authority TA-SIM 118 is in accordance with the following notation, (also indicated in FIG. 3):

$$ENC\text{-}S_{Kp_{TA-SIM}}(ID_{ME},ID_{TA-ME},ID_{SIM}) \quad (42)$$

and is equivalent to:

$$ENC_{Kp_{TA-SIM}}(ID_{ME},ID_{TA-ME},ID_{SIM},$$

$$ENC_{Ki_{SIM}}(H_F(ID_{ME},ID_{TA-ME},ID_{SIM}))) \quad (43)$$

The message (43) contains both the identities $ID_{ME}$, $ID_{TA-ME}$, $ID_{SIM}$ and the signature attached by the device SIM 102 according to the notation (41) and both are encrypted by using the further first public key $Kp_{TA-SIM}$ of the first trusted authority TA-SIM 118.

The first trusted authority TA-SIM 118 decrypts (43) by using the further first intermediate key $Ki_{TA-SIM}$ in accordance with the notation (not shown in FIG. 3):

$$DEC_{Ki_{TA-SIM}}(ENC_{Kp_{TA-SIM}}(ID_{ME},ID_{TA-ME},ID_{SIM},$$

$$ENC_{Ki_{SIM}}(H_F(ID_{ME},ID_{TA-ME},ID_{SIM})))) \quad (44)$$

In such a manner, the first trusted authority TA-SIM 118 recognizes (and stores in an appropriate memory (see, e.g., memory 126 of FIG. 1)) the second $ID_{ME}$ and the further second $ID_{TA-ME}$ identities. By applying the first hash function H to such identities, the first trusted authority TA-SIM 118 is able to calculate the second public key $Kp_{ME}=H(ID_{ME})$ and the further second public key $Kp_{TA-ME}=H(ID_{TA-ME})$.

Optionally, by starting from the identities $ID_{ME}$, $ID_{TA-ME}$, $ID_{SIM}$, the first trusted authority TA-SIM 118 may calculate, autonomously, the signature $H_F(ID_{ME}, ID_{TA-ME}, ID_{SIM})$.

In such a manner, the same trusted authority TA-SIM 118 verifies the SIM signature of (41) by using the first public key $Kp_{SIM}$ of the first device SIM 102. The first trusted authority TA-SIM 118 directly calculates such public key by starting from the first identity $ID_{SIM}$, which is public. That comes about in accordance with the notation (not indicated in FIG. 3):

$$DEC_{K_{SIM}}(ENC_{Ki_{SIM}}(H_F(ID_{ME},ID_{TA-ME},ID_{SIM})) \quad (45)$$

It is observed that the decryption operation (45) comes about in accordance with the property of interchangeability in the use of the public and private keys, such as occurs for example in the IBE method. Such a property is known to any expert in the art.

Following on from (45), the first trusted authority TA-SIM 118 recognizes the digest $H_F(ID_{ME}, ID_{TA-ME}, ID_{SIM})$ sent to it from the SIM 102.

Advantageously, if the transmission of the identities $ID_{ME}$, $ID_{TA-ME}$, $ID_{SIM}$ between the first device SIM 102 and the first trusted authority has come about without any alterations, then the calculated signature and the signature received are equal.

It is observed that all the messages encrypted in accordance with the embodiment of the method of the invention discussed above with respect to FIG. 3, which will be described in the following, will contain the electronic signature of the transmitted message. Such contrivance ensures greater security of transmission.

Subsequent to the decryption of the message sent from the first device SIM 102, the first trusted authority TA-SIM 118 generates the first random number $r_{SIM}$. Using such random number $r_{SIM}$, the first trusted authority TA-SIM 118 generates a first quantity $r^1_{SIM}$ and a second quantity $r^2_{SIM}$ by starting from the first $H(ID_{SIM})$ and the second public keys $H(ID_{ME})$, respectively. In particular, such quantities are calculated in accordance with the preceding equalities (7) and (8).

The first quantity $r^1_{SIM}$ is encrypted by using the first public key $Kp_{SIM}$ and sent as a message to the first device SIM by the first trusted authority TA-SIM 118. The sent message is encrypted in such a manner as to also contain the electronic signature of the first quantity $r^1_{SIM}$ in accordance with the following notation (which is also indicated in FIG. 3):

$$ENC\text{-}S_{K_{PSIM}}(r^1_{SIM}) \qquad (46)$$

which corresponds to $$ENC_{K_{PSIM}}(r^1_{SIM}, ENC_{K_{iTA\text{-}SIM}}(H_F(r^1_{SIM}))) \qquad (47)$$

The message, in accordance with the notation (47), is received by the first device SIM 102 and decrypted by using the first intermediate key $Ki_{SIM}$. That comes about in accordance with the following notation:

$$DEC_{K_{iSIM}}(ENC_{K_{PSIM}}(r^1_{SIM}, ENC_{K_{iTA\text{-}SIM}}(H_F(r^1_{SIM})))) \qquad (48)$$

It is observed that if the first device SIM 102 is able to decrypt such a message received from the first trusted authority TA-SIM, by using the first intermediate key $Ki_{SIM}$, it is automatically authenticated, i.e., it is not possible that a clone is substituting it.

In this way, the first device SIM 102 may recognize (and store in an appropriate memory (see, e.g., memory 110 of FIG. 1)) the first quantity $r^1_{SIM}$. In addition, the first device SIM 102 may check the electronic signature relating to the first quantity $r^1_{SIM}$, thus verifying the correctness of the message received.

Furthermore, the first trusted authority TA-SIM 118 sends an encrypted message containing the second quantity $r^2_{SIM}$ and the electronic signature of such quantity to the second device ME 104, in accordance with the following equation $$ENC\text{-}S_{K_{PME}}(r^2_{SIM}) = ENC_{K_{PME}}(r^2_{SIM}, ENC_{K_{iTA\text{-}SIM}}(H_F(r^2_{SIM}))) \qquad (49)$$

The second device ME 104 decrypts (49) by using the second intermediate key $Ki_{ME}$ in accordance with the notation:

$$DEC_{K_{iME}}(ENC_{K_{PME}}(r^2_{SIM}, ENC_{K_{iTA\text{-}SIM}}(H_F(r^2_{SIM})))) \qquad (50)$$

In such a way, the second device ME 104 recognizes (and stores within a memory (see, e.g., memory 116 of FIG. 1)) the second quantity $r^2_{SIM}$.

It is observed that if the second device ME 104 is able to decrypt (49) received from the first trusted authority TA-SIM 118 with its own second intermediate key $Ki_{ME}$, it is automatically authenticated, i.e., it is not a clone.

The first trusted authority TA-SIM 118 sends an encrypted message containing the identities $ID_{SIM}$, $ID_{TA\text{-}SIM}$, $ID_{ME}$ to the second trusted authority TA-ME 120. Such message also includes the electronic signature of such identities and is in accordance with the equation:

$$ENC\text{-}S_{K_{PTA\text{-}ME}}(ID_{SIM}, ID_{TA\text{-}SIM}, ID_{ME}) = ENC_{K_{PTA\text{-}ME}}$$
$$(ID_{SIM}, ID_{TA\text{-}SIM}, ID_{ME}, ENC_{K_{iTA\text{-}ME}}(H_F(ID_{SIM}, ID_{TA\text{-}SIM}, ID_{ME}))) \qquad (51)$$

The second trusted authority TA-ME 120 decrypts such a message by using the further second intermediate key $Ki_{TA\text{-}ME}$ in accordance with equation:

$$DEC_{K_{iTA\text{-}ME}}(ENC_{K_{PTA\text{-}ME}}(ID_{SIM}, ID_{TA\text{-}SIM}, ID_{ME}, ENC_{K_{iTA\text{-}ME}}(H_F(ID_{SIM}, ID_{TA\text{-}SIM}, ID_{ME})))) \qquad (52)$$

Hence, the second trusted authority TA-ME recognizes (and stores in memory (see, e.g., memory 132 of FIG. 1) the identities $ID_{SIM}$, $ID_{TA\text{-}SIM}$ e $ID_{ME}$. In particular, from the first $ID_{SIM}$ and from the second $ID_{ME}$ identities, the second trusted authority TA-ME 120 is able to generate the first $Kp_{SIM}=H(ID_{SIM})$ and the second $Kp_{ME}=H(ID_{ME})$ public keys, respectively.

Subsequently, the second trusted authority TA-ME 120 generates the second random number $r_{ME}$. Using such random number $r_{ME}$, the second trusted authority TA-ME 120 generates the third quantity $r_{ME}$ and the fourth quantity $r^2_{ME}$ by starting from the second $H(ID_{ME})$ and from the first $H(ID_{SIM})$ public keys, respectively. It is observed that, in particular, such quantities are calculated in accordance with the previous equalities (15) and (16).

The fourth quantity $r^2_{ME}$ is encrypted by using the first public key $Kp_{SIM}$ and sent as a message to the first device SIM 102 by the second trusted authority TA-ME 120. The message sent is encrypted in such a manner as to also contain the electronic signature of the fourth quantity $r^2_{SIM}$ in accordance with the following notation (which is also indicated in FIG. 3):

$$ENC\text{-}S_{K_{PSIM}}(r^2_{ME}) = ENC_{K_{PSIM}}(r^2_{ME}, ENC_{K_{iTA\text{-}ME}}(H_F(r^2_{ME}))) \qquad (53)$$

The message, in accordance, with the notation (53), is received by the first device SIM 102 and decrypted by using the first intermediate key $Ki_{SIM}$ in accordance with the notation:

$$DEC_{K_{iSIM}}(ENC_{K_{PSIM}}(r^2_{ME}, ENC_{K_{iTA\text{-}ME}}(H_F(r^2_{ME})))) \qquad (54)$$

It is observed that if the first device SIM 102 is able to decrypt such a message received from the second trusted authority TA-ME 120, it is automatically authenticated, i.e., it is not possible that a clone is substituting it.

In this way, the first device SIM 102 may recognize (and store in an appropriate memory (see, e.g., memory 110 of FIG. 1)) the fourth quantity $r^2_{ME}$. In addition, the first device SIM 102 may check the electronic signature relating to the fourth quantity $r^2_{ME}$, thus verifying the correctness of the message received.

Furthermore, the second trusted authority TA-ME 120 sends an encrypted message containing the third quantity $r^1_{ME}$ and the electronic signature of such quantity to the second device ME 104, in accordance with the following equation:

$$ENC\text{-}S_{K_{PME}}(r^1_{ME}) = ENC_{K_{PME}}(r^1_{ME}, ENC_{K_{iTA\text{-}ME}}(H_F(r^1_{ME}))) \qquad (55)$$

The second device ME 104 decrypts (55) by using the second intermediate key $Ki_{ME}$ in accordance with the notation:

$$DEC_{K_{iME}}(ENC_{K_{PME}}(r^1_{ME}, ENC_{K_{iTA\text{-}ME}}(H_F(r^1_{ME})))) \qquad (56)$$

In this way, the second device ME 104 recognizes (and stores within memory space (see, e.g., memory 116 of FIG. 1) the third quantity $r^1_{ME}$.

It is observed that if the second ME 104 device-is-able to decrypt (55) received from the second trusted authority TA-ME 120, it is automatically authenticated, i.e., it is not a clone.

The secret session keys associated with the first SIM 102 and the second ME 104 devices may be generated by starting from the quantities which the first SIM 102 and the second ME 104 devices have received from the trusted authorities. Analogously to that described in relation to the embodiment described with respect to FIG. 1, the secret session keys of the first SIM 102 and the second ME 104 devices may be generated, for example, in accordance with equations:

$$Ks_{SIM} = H_1(ê(H(ID_{ME}), r^1_{SIM} + r^2_{ME})) \quad (57)$$

$$Ks_{ME} = H_1(ê(r^1_{ME} + r^2_{SIM}, H(ID_{SIM}))) \quad (58)$$

and, as shown previously, such keys are identical.

It is useful to observe that the secret session key $Ks_{SIM} = Ks_{ME}$ generated in the embodiments described, may be related to each specific communication session between the devices. Such key may be re-calculated at each new communication session, such as, for example, due to the switching on again of the cellular telephone.

Furthermore, such key may be changed during the same communication session and due to the refreshing of the identities by the first TA-SIM 118 and the second TA-ME 120 trusted authorities (for example, when a date is associated with the identity).

It is observed that the embodiments of the method of the invention described, enable the first SIM 102 and the second ME 104 devices for the joint decryption of a generic message encrypted by using the joint identity associated with both.

In particular, in accordance with the embodiments of the method of the invention, the first SIM 102 and the second ME 104 devices may be jointly identified in that they are both associated with a single or common entity. A generic message may be encrypted with the IBE method using the aforesaid common entity so that only the joint operation of the two devices allows its decryption.

Furthermore, none of the trusted authorities related to the devices associated with the common entity recognizes the keys indispensable for decrypting the messages received conjointly by the devices themselves. Nevertheless, both trusted authorities cooperate in order to reconstruct such keys. Consequently, it is the common entity may be governed by a virtual authority, known as the Virtual Trusted Authority VTA.

It is observed that a joint identity or joint public key $Kp_{ME/SIM}$ is associated with the common entity 103 comprising the first SIM 102 and the second ME 104 devices. Such joint identity $Kp_{ME/SIM}$ corresponds to the sum of the second $H(ID_{ME})$ and the first $H(ID_{SIM})$ public keys, i.e., to the following equation:

$$Kp_{ME/SIM} = H(ID_{ME}) + H(ID_{SIM}) \quad (59)$$

With reference to the embodiments discussed above with respect to FIGS. 1 and 3, a joint private key $d_{ME/SIM}$, i.e., a private key associated with the common entity, is in accordance with the following equation:

$$d_{ME/SIM} = (r_{ME} + r_{SIM}) \cdot (H(ID_{ME}) + H(ID_{SIM})) \quad (60)$$

wherein $r_{ME}$ and $r_{SIM}$ are the random numbers generated by the trusted authorities.

Alternatively, the joint private key $d_{ME/SIM}$, with reference to the embodiments discussed with respect to FIG. 2, is in accordance with the equation $$d_{ME/SIM} = (s_{TA-ME} + s_{Ta-SIM}) \cdot (H(ID_{ME}) + H(ID_{SIM})) \quad (61)$$

wherein the sum of the second and the first random numbers $r_{ME} + r_{SIM}$ is substituted by the sum of the second and the first $s_{TA-ME} + s_{Ta-SIM}$ master keys.

An example of the encryption of a message to the common entity comprising the two devices and the joint decryption of such a message will be described below.

For reasons of brevity, it is observed that the example is in accordance with the embodiments of the method of the invention discussed above with respect to FIGS. 1 and 3. Nevertheless, through appropriate adaptations, the example in question could also be applied to the embodiments discussed with respect to FIG. 2.

Above all, a third device C which intends to transmit a digital message M to the common entity comprising the first SIM 102 and the second ME 104 devices, must first appropriately encrypt such a message M by carrying out the following steps of the process.

In a first instant, such third device C, which recognizes the characteristic parameters of the trusted authorities, acquires (and memorizes) from the first TA-SIM 118 and from the second TA-ME 120 trusted authorities further first $r_{SIM} \cdot P$ and further second $r_{ME} \cdot P$ points from the additive group $G_1$, respectively, i.e., the device C acquires the external product between the first random number $r_{SIM}$ and the point P and the external product between the second random number $r_{ME}$ and the point P. In this way, the third device C may calculate (and memorize) a joint public point $P_{pubME/SIM}$ in accordance with the following equation:

$$P_{pubME/SIM} = (r_{SIM} \cdot P + r_{ME} \cdot P) \quad (62)$$

It is observed that in order to calculate said joint public point in accordance with embodiments discussed with respect to FIG. 2, it is enough to substitute the first $r_{SIM}$ and the second $r_{ME}$ random numbers with the first $s_{TA-SIM}$ and with the second $s_{TA-ME}$ master keys, respectively.

Subsequently, the third device C follows the Boneh and Franklin protocol in order to encrypt the message.

The third device C generates a further random number x which is an integer and generates a first point U of the additive group $G_1$ in accordance with the equation:

$$U := x \cdot P \quad (63)$$

Furthermore, the device C generates the string of bits V in accordance with the following equation:

$$V := H_1(ê(Kp_{ME/SIM}, x \cdot P_{pubME/SIM})) \quad (64)$$

As is shown in (64), the third device C applies the bilinear function ê to the joint public key $Kp_{ME/SIM}$ and to the external product between the further random number x and the joint public point $P_{pubME/SIM}$. The result of such an operation belongs to the finite multiplicative group $G_2$ and the string of bits V is extracted from such result by using the second hash function $H_1$.

Finally, the device C encrypts the message M to be sent to the common entity. The encrypted and transmitted message is generally indicated by the notation:

$$<U, M \oplus V> \quad (65)$$

on the basis of which the encrypted message comprises, in a first part, the first point U and in a second part, the result of the operation $M \oplus V$. As is apparent to the expert in the art, the operator "⊖" represents an OR-exclusive or XOR type operation between bits between the digital message in clear M and the string of bits V.

The first SIM 102 and the second ME 104 devices simultaneously receive the encrypted message (65) and may generate, simultaneously and autonomously from one another, a first $W_{SIM}$ and a second $W_{ME}$ half decryption token, respectively. In particular, such first $W_{SIM}$ and second $W_{ME}$ half tokens are numbers which are generated by starting from an initial part of the encrypted message (65) (i.e., the first point U) and by using the quantities which each device has received from the trusted authorities in the preceding step.

Indeed, the first half token $W_{SIM}$ is generated by the first device SIM 102 (which also memorizes it in its own memory) by applying the bilinear function ê to the first point U and to the sum of the first $r^1_{SIM}$ and of the fourth $r^2_{ME}$ quantities, as expressed by the following equality:

$$W_{SIM} := \hat{e}(r^1_{SIM} + r^2_{ME}, U) \tag{66}$$

By starting from (66) and by using subsequent steps in which account is taken of the equations (3), (7), (16) and (63) introduced previously, the first half token $W_{SIM}$ also corresponds to:

$$\begin{aligned} W_{SIM} &:= \hat{e}(r_{SIM} \cdot H(ID_{SIM}) + r_{ME} \cdot H(ID_{SIM}), x \cdot P) \\ &= \hat{e}(H(ID_{SIM}), x \cdot P) \wedge (r_{ME} + r_{SIM}) \\ &= \hat{e}(H(ID_{SIM}), P) \wedge x(r_{ME} + r_{SIM}) \end{aligned} \tag{67}$$

Analogously, the second half token $W_{ME}$ is generated by the second device ME 104 (and is memorized within the memory of the latter) by applying the bilinear function ê to the first point U and to the sum of the third $r^1_{ME}$ and of the second $r^2_{SIM}$ quantities, as expressed by the following equality:

$$W_{ME} := \hat{e}(r^1_{ME} + r^2_{SIM}, U) \tag{68}$$

By starting from (68) and by using subsequent steps in which account is taken of the equations (3), (8), (15) and (63) introduced previously, the second half token $W_{ME}$ also corresponds to:

$$\begin{aligned} W_{ME} &:= \hat{e}(r_{ME} \cdot H(ID_{ME}) + r_{SIM} \cdot H(ID_{ME}), x \cdot P) \\ &= \hat{e}(H(ID_{ME}), x \cdot P) \wedge (r_{ME} + r_{SIM}) \\ &= \hat{e}(H(ID_{ME}), P) \wedge x(r_{ME} + r_{SIM}) \end{aligned} \tag{69}$$

The first device SIM 102 sends the first half decryption token $W_{SIM}$ generated by encrypting it with its own session key $Ks_{SIM}$, to the second device ME 104. In an analogous way, the second device ME-104 transmits the second half token $W_{ME}$ encrypting it with its own session key $Ks_{ME}$, to the first SIM 102. In such a way, each device is able to autonomously generate a joint decryption key W by starting from such half tokens. Such joint decryption key W is a number which both devices may calculate in accordance with the following equation:

$$W = H_1(W_{ME} * W_{SIM}) \tag{70}$$

wherein the symbol "*" indicates an internal product within the multiplicative group $G_2$.

From (67) and (69), the equation (70) is equivalent to $$\begin{aligned} W &= H_1(\hat{e}(H(ID_{ME}) + H(ID_{SIM}), P) \wedge x(r_{ME} + r_{SIM})) \\ &= H_1(\hat{e}((r_{ME} + r_{SIM}) \cdot (H(ID_{ME}) + H(ID_{SIM})), x \cdot P)) \\ &= H_1(\hat{e}(d_{ME/SIM}, U)) \end{aligned} \tag{71}$$

i.e., the joint decryption key W corresponds to applying the bilinear function ê to the joint private key $d_{ME/SIM}$ and to the point U.

Furthermore, it is observed that due to a property of bilinearity, the equation (71) compares to:

$$\begin{aligned} W &= H_1(\hat{e}(d_{ME/SIM}, U)) \\ &= H_1(\hat{e}((r_{ME} + r_{SIM}) \cdot (H(ID_{ME}) + H(ID_{SIM})), x \cdot P)) \\ &= H_1(\hat{e}(H(ID_{ME}) + H(ID_{SIM}), P) \wedge x(r_{ME} + r_{SIM})) \\ &= H_1(\hat{e}(H(ID_{ME}) + H(ID_{SIM}), x(r_{ME} + r_{SIM}) \cdot P)) \\ &= H_1(\hat{e}(Kp_{ME/SIM}, x \cdot P_{pubME/SIM})) \end{aligned} \tag{72}$$

Equation (72) corresponds to (64), or rather to the string of bits V.

On the basis of such result, the message M originally encrypted by the third device C may be restored, autonomously, both by the first SIM 102 and by the second ME 104 devices by carrying out another XOR operation between the encrypted message M⊕V and the joint decryption key W, as shown in the following equation:

$$M \oplus V \oplus W + M \tag{73}$$

Advantageously, the joint decryption key W is related to a specific joint decryption session of the message by the first SIM 102 and by the second ME 104 devices and is recalculated for each specific decryption session. Alternatively, said key W is periodically recalculated. An additional functionality of the method of the invention provides for the possibility of securely memorizing the sensitive data of one device within the memory of the other. For example, the first device SIM 102 may memorize its own sensitive data, for simplicity, indicated as the generic message M1, within the memory of the second device ME 104 by simply encrypting such data with a first random string H'($W_{SIM}$) according to the equation:

$$M1 \oplus H'(W_{SIM}) \tag{74}$$

i.e., by carrying out the XOR operation between the sensitive data M1 and said string obtained by applying a third hash function H' to the first half decryption token $W_{SIM}$. Such hash function H' is distinct from the second hash function $H_1$, despite having the same characteristics of the latter.

The data encrypted in accordance with (74) are sent to the second device ME 104 which in turn encrypts them by carrying out an additional XOR operation by using a second random string H'($W_{ME}$) obtained by applying the hash function H' to the second half token $W_{ME}$, i.e.,:

$$M1 \oplus H'(W_{SIM}) \oplus (H'(W_{ME}) \tag{75}$$

The overall encrypted message obtained is stored within the memory 116 of the second device ME 104 and may remain there even when the first device SIM 102 is disconnected from the second device ME 104. Advantageously, in order to decrypt any such future messages the original device SIM 102 will be connected to the second device ME 104.

Furthermore, it is observed that both the cryptography algorithms and the method procedures with which the various cryptographic keys, the numerical quantities and the decryption tokens are generated are implemented in hardware, software or hybrid procedures, i.e., by combining hardware and software. In particular, the algorithms or the software implemented method procedures are contained within memory storage space belonging to the trusted authorities or the first SIM 102 and the second ME 104 devices. The hardware-type procedures are implemented through appropriate electronic circuitry.

For example, in correspondence with a trusted authority in which there are no dimensional or power dissipation limitations, such procedures may be preferably implemented in a hardware manner, i.e., by integrating with electronic circuitry. On the contrary, within the individual devices (SIM 102 or ME 104) wherein the previously mentioned limitations are considerable, it may be preferable to implement the method algorithms and procedures through software.

It is observed that the embodiments of the methods discussed above allow sending a message M simultaneously to two devices by carrying out a unique encryption operation, showing itself therefore to be simple and versatile from the computational point of view, without compromising the confidentiality of the transmission.

Furthermore, in accordance with the embodiments discussed above, the first SIM 102 and the second ME 104 devices both take part in decrypting the encrypted message M sent to both of them by generating the corresponding half decryption tokens.

As a consequence of the reciprocal exchange of such tokens between the devices, the first SIM 102 and the second ME 104 devices may generate the joint decryption key W in order to decrypt the encrypted message received in parallel, i.e., they may decrypt such a message independently from one another.

In this way, the need for both devices having to decrypt the encrypted message received in turn, in order to restore the message in clear, such as currently occurs with the known art, is avoided. Indeed, by applying the known art, following the first decryption, the entire message, which is still not intelligible, must be exchanged between the devices, hence the quantity of information which they must exchange is considerable. Furthermore, in conventional approaches, the device which lastly decrypts the encrypted message in order to restore the message in clear is in a position of advantage with respect to the other within the joint decryption operation.

Instead, in some of the described embodiments of the invention, the devices forming the common entity autonomously decrypt the encrypted message received, only after having each independently generated the joint decryption key W.

Ultimately, the devices having recourse to the described embodiments of the method of the invention generally have an equal role during the decryption operation and enjoy the same advantages.

The devices exchange their half decryption tokens with one another, i.e., exchange a much reduced quantity of information.

The term "computer-readable medium" as used herein refers to any medium that participates in providing instructions to a processor, such as processor 108 in FIG. 1, for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
   a) associating a single joint identity with first and second electronic devices which identifies a common entity that is formed by the first and the second electronic devices, the single joint identity identifying the common entity to a transmission device, the first electronic device being associated with a first trusted authority, and the second electronic device being associated with a second trusted authority;
   b) executing, by the transmission device, a single encryption operation of a message in clear by using the single joint identity so as to encrypt said message and transmitting the encrypted message simultaneously to the first and the second electronic devices;
   c) generating, by the first and the second electronic devices a first decryption token and a second decryption token, respectively, said first and second decryption tokens being obtained based on quantities provided by at least said first trusted authority, said quantities being calculated from random numbers, public keys, and master keys;
   d) providing said first decryption token to the second electronic device and said second decryption token to the first electronic device; and
   e) generating, by starting from said first and second decryption tokens, by the first and second electronic devices, a joint decryption key in order to decrypt the encrypted message,
   wherein the second electronic device is not associated with said first trusted authority and the first electronic device is not associated with said second trusted authority, said second trusted authority being distinct and autonomous with respect to said first trusted authority.

2. The method according to claim 1 wherein said second trusted authority provides further of said quantities to the first and to the second electronic devices for said generating of said first and second decryption tokens.

3. The method according to claim 2 wherein said c) includes:
   providing to the first and to the second electronic devices, first and second of quantities for said generating of said first and second decryption tokens, respectively; said first and second of said quantities being generated by the first trusted authority; and providing to the second and first electronic devices, third and fourth of said quantities for said generating of said second and first decryption tokens, respectively, said third and fourth quantities being generated by the second trusted authority.

4. The method according to claim 2 wherein first and second identities are associated with the first and the second electronic devices, respectively and further first and further second identities are associated with the first and the second trusted authorities; the method additionally comprising:

generating a first and a second of said public keys, obtained by applying a first hash function to the first and the second identities.

5. The method according to claim 3 wherein first and second identities are associated with the first and the second electronic devices, respectively and further first and further second identities are associated with the first and the second trusted authorities; the method additionally comprising:

generating a first and a second of said public keys, obtained by applying a first hash function to the first and the second identities, wherein:

said first and said second quantities are calculated by the first trusted authority by starting from a first of said random numbers and from the first public key of the first electronic device and by starting from the first random number and from the second public key of the second electronic device, respectively; and said third and said fourth quantities are calculated by starting from a second of said random numbers and from the second public key and by starting from the second random number and from the first public key, respectively.

6. The method according to claim 3 wherein first and second identities are associated with the first and the second electronic devices, respectively and further first and further second identities are associated with the first and the second trusted authorities; the method additionally comprising:

generating a first and a second of said public keys, obtained by applying a first hash function to the first and the second identities, wherein:

said first and said second quantities are calculated by starting from a first of said master keys and from the first public key and by starting from the first master key and from the second public key, respectively; and said third and said fourth quantities are calculated by starting from a second of said master keys and from the second public key and by starting from the second master key and from the first public key, respectively.

7. The method according to claim 3 wherein the generating the first decryption token by the first device includes applying a bilinear function to a sum of the first and the fourth quantities, and to a first point of an additive group.

8. The method according to claim 7 wherein the generating the second decryption token by the second device includes applying the bilinear function to a sum of the second and the third quantities, and to the first point of the additive group.

9. The method according to claim 2 wherein said e) includes applying, independently by each said electronic device, a second hash function to an internal product between the first and the second decryption tokens, in order to generate said joint decryption key.

10. The method according to claim 5, further comprising:

associating with the common entity that includes the first and the second electronic devices, a joint public key corresponding to a sum of the second and the first public keys; and associating, with said common entity, a joint private key defined as a product of said joint public key and a sum of the second and the first random numbers.

11. The method of claim 6, further comprising:

associating with the common entity that includes the first and the second electronic devices, a joint public key corresponding to a sum of the second and the first public keys; and associating, with said common entity, a joint private key defined as a product of said joint public key and a sum of the second and the first master keys.

12. The method according to claim 2, wherein said b) includes, with relation to the transmission device:

acquiring a further first and a further second point from the first and the second trusted authorities, respectively, for generation of a joint public point;

generating the first point as a product of a further random number and a point and a string of bits in order to encrypt the message in clear; and generating the encrypted message having the first point in a first part and a result of an XOR operation between bits between the message in clear and said string in a second part.

13. The method according to claim 12, further comprising restoring the message in clear by carrying out a further XOR operation between bits between the encrypted message and the joint decryption key, said joint decryption key being mathematically coincident with the string of bits.

14. The method according to claim 3, further comprising:

sending of an encrypted message containing the first quantity and the second quantity, from the first trusted authority to the first and the second electronic devices, respectively; and sending of an encrypted message containing the fourth quantity and the third quantity, from the second trusted authority to the first and the second electronic devices, respectively.

15. The method according to claim 14 wherein said sending the first quantity from the first trusted authority to the first electronic device is carried out by encrypting such quantity in accordance with at least one of a symmetrical type cryptographic method or an identity-based encryption method.

16. The method according to claim 14 wherein said sending the second quantity from the first trusted authority to the second electronic device is carried out by encrypting such quantity in accordance with an identity-based encryption method.

17. The method according to claim 15, additionally comprising generating, by same said first trusted authority, an electronic signature by starting from said first quantity.

18. The method according to claim 17, further comprising sending a message comprising said first quantity and said electronic signature to the first electronic device by the first trusted authority, said message being encrypted in accordance with an identity-based encryption method.

19. The method according to claim 4, further comprising sending said first and said further first identities from the first electronic device to the second electronic device, and sending said second and said further second identities from the second electronic device to the first electronic device.

20. The method according to claim 19, further comprising sending an encrypted message containing said second and said further second identities to the first trusted authority by the first electronic device, said message being encrypted in accordance with at least one of a symmetrical type or an identity-based encryption method.

21. The method according to claim 19, further comprising sending an encrypted message containing the second and the further second identities and, optionally, the first identity to the first trusted authority from the first electronic device, said message having an electronic signature of the said identities generated by the first electronic device and being encrypted in accordance with an identity-based encryption method.

22. The method according to claim 1 wherein said d) includes:
sending the first decryption token from the first electronic device to the second electronic device in an encrypted manner;
sending the second decryption token from the second electronic device to the first electronic device in an encrypted manner.

* * * * *